United States Patent
Stahl

(10) Patent No.: US 8,771,837 B2
(45) Date of Patent: Jul. 8, 2014

(54) METAL FIBER WITH CHAMFERED LONGITUDINAL CORNERS

(75) Inventor: Karl-Hermann Stahl, Voehringen (DE)

(73) Assignee: Cent & Cent GmbH & Co. KG, Erbach (DE)

( * ) Notice: Subject to any disclaimer, the term of this patent is extended or adjusted under 35 U.S.C. 154(b) by 177 days.

(21) Appl. No.: 13/389,960

(22) PCT Filed: Jul. 7, 2010

(86) PCT No.: PCT/DE2010/000787
§ 371 (c)(1),
(2), (4) Date: Feb. 10, 2012

(87) PCT Pub. No.: WO2011/041995
PCT Pub. Date: Apr. 14, 2011

(65) Prior Publication Data
US 2012/0231291 A1    Sep. 13, 2012

(30) Foreign Application Priority Data
Oct. 8, 2009   (DE) .................. 10 2009 048 751

(51) Int. Cl.
*E04C 5/03* (2006.01)
*E04C 5/01* (2006.01)
*C04B 14/48* (2006.01)

(52) U.S. Cl.
CPC . *E04C 5/012* (2013.01); *E04C 5/03* (2013.01); *E04C 5/01* (2013.01); *C04B 14/48* (2013.01)
USPC .............. 428/600; 428/606; 106/644; 52/851

(58) Field of Classification Search
None
See application file for complete search history.

(56) References Cited

U.S. PATENT DOCUMENTS

| 867,090 | A | * | 9/1907 | Wolf | 52/850 |
|---|---|---|---|---|---|
| 872,127 | A | * | 11/1907 | Havemeyer | 52/850 |
| 928,430 | A | * | 7/1909 | Dudley | 52/850 |
| 931,185 | A | * | 8/1909 | Dudley | 52/850 |
| 931,322 | A | * | 8/1909 | Lindau | 52/851 |
| 939,962 | A | * | 11/1909 | Jenks | 52/850 |
| 982,682 | A | * | 1/1911 | Johnson | 52/851 |
| 984,283 | A | * | 2/1911 | Maxwell | 72/196 |
| 1,023,149 | A | * | 4/1912 | Havemeyer | 52/850 |
| 1,147,603 | A | * | 7/1915 | Boyer | 52/851 |
| 1,164,477 | A | * | 12/1915 | Dale | 52/851 |
| 1,280,046 | A | * | 9/1918 | Kuhne | 52/850 |

(Continued)

FOREIGN PATENT DOCUMENTS

| DE | 805711 B | 5/1951 |
|---|---|---|
| EP | 1375773 A | 1/2004 |
| FR | 1382445 B | 11/1964 |
| HU | 212747 | * 10/1996 |

*Primary Examiner* — John J Zimmerman
(74) *Attorney, Agent, or Firm* — Andrew Wilford

(57) ABSTRACT

The metal fiber has fiber outer surfaces (1) oriented substantially at right angles to each other and can also be provided with bent ends in the shape of a clip. The metal fiber is used to stabilize, strengthen, or fasten materials such as concrete, wood and the like. The fiber edges (2) formed by the fiber outer surfaces (1) of the metal fiber and extending in the longitudinal direction of the fiber are designed as edge surfaces (4) oriented at an angle to the fiber outer surfaces (1) in the manner of a chamfer. Said edge surfaces (4) have projections, which form anchoring heads (3) that are anchored in the materials to be stabilized, strengthened, or fastened.

11 Claims, 1 Drawing Sheet

(56) References Cited

U.S. PATENT DOCUMENTS

| | | | | |
|---|---|---|---|---|
| 1,364,182 A | * | 1/1921 | Conkling | 52/850 |
| 1,423,163 A | * | 7/1922 | Simpson | 52/850 |
| 1,477,378 A | * | 12/1923 | Ohlson et al. | 52/850 |
| 1,635,658 A | * | 7/1927 | Boardman | 52/850 |
| 2,347,904 A | * | 5/1944 | Greulich | 72/160 |
| 2,948,084 A | * | 8/1960 | Shockey | 52/565 |
| 3,214,877 A | * | 11/1965 | Akin | 428/574 |
| 3,953,953 A | * | 5/1976 | Marsden | 428/603 |
| 4,137,686 A | * | 2/1979 | Kern | 52/853 |
| 4,804,585 A | * | 2/1989 | Tani et al. | 428/574 |
| 4,883,713 A | * | 11/1989 | Destree et al. | 428/397 |
| 4,899,515 A | * | 2/1990 | Potucek | 52/850 |
| 4,960,649 A | * | 10/1990 | Takata et al. | 428/574 |
| 5,215,830 A | * | 6/1993 | Cinti | 428/606 |
| 5,451,471 A | * | 9/1995 | Over et al. | 428/574 |
| 5,989,713 A | | 11/1999 | Naaman | |
| 6,235,108 B1 | | 5/2001 | Lambrechts | |
| 2011/0212343 A1 | | 9/2011 | Stahl | |
| 2013/0216851 A1 | * | 8/2013 | Stahl | 428/596 |

* cited by examiner

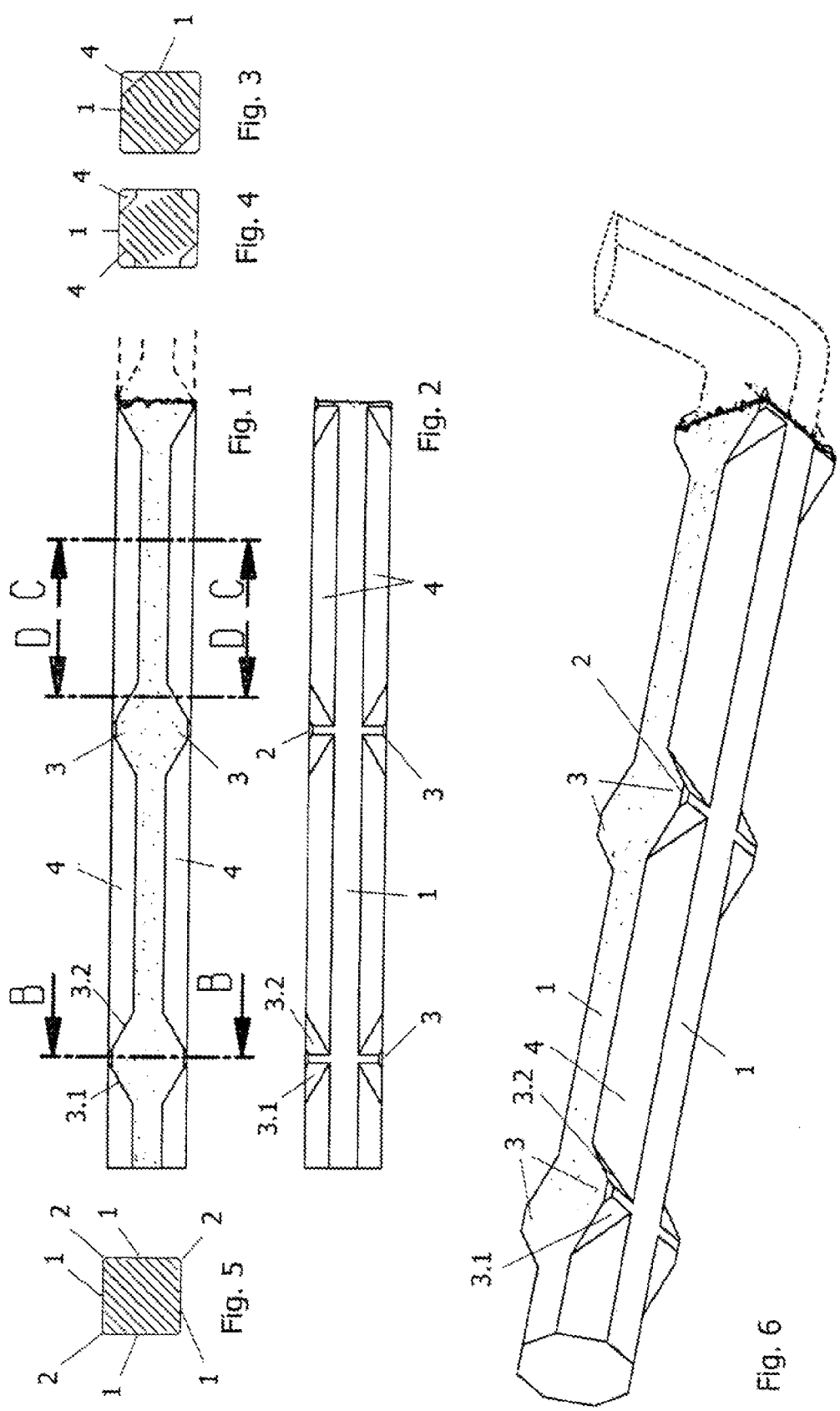

METAL FIBER WITH CHAMFERED LONGITUDINAL CORNERS

CROSS REFERENCE TO RELATED APPLICATIONS

This application is the US-national stage of PCT application PCT/DE2010/000787 filed 7 Jul. 2010, published 14 Apr. 2011 as WO2011/041995, and claiming the priority of German patent application 102009048751.4 itself filed 8 Oct. 2009.

FIELD OF THE INVENTION

The invention relates to a metal fiber having outer faces oriented substantially at right angles to one another, and also having bent ends in the shape of a fastener, for stabilizing, strengthening, or fastening materials such as concrete, wood, and the like.

BACKGROUND OF THE INVENTION

Such metal fibers when straight are employed for example as concrete additives for improving the performance of concrete with respect to tensile, pressure, and shock loadability, which can for instance prevent a crack that forms in the concrete from progressing due to increased expansion. Metal fibers with bent ends, that is U-shaped like fasteners, are used as a connecting element in soft and elastic materials, for example in the broadest context in the wood industry, in the construction and furniture industries, and in the plastics industry.

As a rule, in all of these applications it is desirable to influence the metal fibers with respect to their shape such that they are able to absorb tensile forces from the materials surrounding them. To this end, in metal fibers for use in concrete and usually formed as steel wire fibers, it is common practice to add for instance bends at the fiber ends, where the tensile forces that can be absorbed because of this are relatively limited because the hook shape of the steel wire fiber changes under tensile stress, that is, can be pulled out of the channel it created. In principle only the friction fit between fiber and concrete is improved by the hook shape at the two wire steel fiber ends.

Such a shape is hardly possible in staples that are used for instance in electrical tackers and a plurality of which to this end are glued together in stacks, so that in this case it is always necessary to work with fasteners that have relatively long legs in order to apply sufficient frictional forces by the material surrounding the fasteners to prevent the fasteners from being easily pulled out.

OBJECT OF THE INVENTION

Proceeding from this point, the underlying object of the invention is to improve metal fibers of both fiber types identified above such that, with respect to the material surrounding them, they apply significantly higher resistance forces against tensile stress in their longitudinal direction with the same length. The improvement must be possible without great additional complexity using a new manufacturing method.

SUMMARY OF THE INVENTION

The invention attains this object in that the corners formed by the outer faces of the metal fiber and extending longitudinally of the fiber are chamfered to form edge faces oriented at an angle to the outer faces, and in that these edge faces have projections that form anchor heads for the materials to be stabilized, strengthened, or fastened.

The advantage attained by the invention is substantially that when there is tensile stress, these anchor heads, of which a plurality may be provided longitudinally of the metal fibers, individually apply high frictional forces to the surrounding material so that significantly greater strength is attained with the same fiber length overall.

In one preferred embodiment of the invention the anchor heads form beveled anchor faces that enlarge the cross-section of the fiber in the area of the edge faces, the cross-section of the fiber having a substantially square shape in the centers of the anchor heads.

It has further proved advantageous when the beveled anchor faces are inclined at an angle of 10° to 60° relative to the longitudinal axis of the fiber and, if made from strip material, at an angle to the former starting material strip surface. It is particularly advantageous when the beveled anchor faces are oriented at an angle of 15° to 30° to the longitudinal axis of the fibers that are used in concrete.

Normally the metal fibers, especially the straight steel fibers that are used in concrete, are formed such that the eight beveled anchor faces of an anchor head are arranged axially symmetrical and symmetrical to the center of the anchor head, that is, at the same angle.

For the metal fiber fastener, it is possible in order to increase the frictional forces in one direction, in any case, without weakening the anchor heads themselves; it can also be advisable to arrange the beveled anchor faces of an anchor head in a manner asymmetrical to the center of the anchor head, that is, at unequal angles, the beveled anchor face closer to the end of the metal fiber advantageously and facing in the direction in which it is driven in having a smaller angle.

In the invention, the edge faces may meet the outer face at an angle of 30° to 60°. Normally the orientation is such that the edge faces meet the outer face at an angle of 45°. If the metal fibers are manufactured from strip material using a notching roll, two of the outer faces are formed from the strip surface and another two from the break surface.

Furthermore shaping has proved itself in which the width of the outer face in the area between the anchor heads is about 33% of the thickness or width of the fiber. This results in an approximately octagonal cross-section between the anchor heads in the steel fiber for concrete.

In general, the metal fiber can vary when considered from the longitudinal axis, especially with respect to its geometric properties. Thus the anchor heads can differ from one another in terms of their shape and size; the edge faces between two anchor heads may be formed differently in their width and angular position, and the interval between the individual anchor heads may be selected to be equidistant or periodic or changing freely.

The starting material for the metal fiber may be selected with respect to material strength and hardness as appropriate to the application; therefore the entire strength range from soft to hard is considered for the starting material. The low strength range is more appropriate for the steel fibers for use in the concrete and the high to highest strength range is more appropriate for the metal fiber fasteners.

All suitable starting forms are considered as starting material for the manufacture of the metal fibers. Conventional steel wire may also be used for this. With respect to a simple and cost-effective manufacturing process, however, it is advantageous for the metal fibers to be produced from strip material using a notching roll, with a subsequent flexing process if needed, prior to the separating process. If steel fibers for use in concrete are produced from strip material using a notching roll process, the steel fiber wire strip formed in this manner is then separated. The anchor formations are produced by V-shaped interruptions in the notching projections for the notching roller. The configuration of the wedge-shaped anchor formations occurs due to the V angle of the interruptions and due to the selected depth of these V-shaped interruptions relative to the notch depth. The V angle results in the beveled anchor angle on the product. The size of the anchor formation is determined by the notch depth and the depth of the V-shaped interruptions. If, for instance, the V-shaped interruption is formed deeper than the planned notch depth, then the center of the anchor head is wider. As a rule the V-shaped interruptions are ground into the rolling tool parallel to the rolling tool axis at the desired interval for the anchor formations. If it is considered useful, the V-shaped interruptions may also be ground in in a spiral shape. The separation of the steel fiber wire strips into steel fiber wires can be accomplished using a shearing process that follows the notch bottom; the anchor formations are deformed relatively severely when using a conventional shearing process. It is therefore advisable that the separating process be prepared for using a flexing process, with scratching of the anchor heads aligned with the individual notch bottoms. The steel fiber wires must then be cut to the desired steel fiber length. The method according to DE 10 2008 034 250 [US2011/0212343] should be used for steel fiber fasteners with anchoring.

Normally the anchor heads are arranged on all four edge faces and at the same height relative to the longitudinal axis of the fibers. However, it is also possible to make the anchor heads at different intervals from one another or even just by pairs on the edge faces of the strip top and strip bottom.

The latter is particularly advisable if the metal fiber is made as a fastener, the anchor heads then being provided only on the two edge faces adjacent an outer face, the ends then being angled to the fastener such that the anchor heads oppose one another on the inside of the fastener.

BRIEF DESCRIPTION OF THE DRAWING

The invention is explained in greater detail in the following with reference to an embodiment of a steel fiber for concrete that is shown in the drawings;

FIG. 1 is a side elevational view of a segment of a metal fiber according to the invention;

FIG. 2 is a top view of the segment shown in FIG. 1;

FIG. 3 is a cross-section through the segment according to FIG. 1 along line C-C;

FIG. 4 is a cross-section through the segment according to FIG. 1 along line D-D;

FIG. 5 is a cross-section through the segment according to FIG. 1 along line B-B;

FIG. 6 is a perspective elevational view of the metal fiber.

SPECIFIC DESCRIPTION OF THE INVENTION

The steel fiber shown in the drawings is provided for use in concrete and is intended to improve the performance of the concrete with respect to tensile, pressure, and shock loadability. If a crack has formed in the concrete, the steel fibers are intended where possible to prevent this crack from spreading. A U-shaped bent metal-fiber fastener (not shown in greater detail in the drawings) is frequently used for example as a versatile connecting element in a relatively soft and elastic material, such as for instance all types of wood and plastic, in construction and in the furniture industry.

The metal fiber, which in this illustrated embodiment is produced using the above-described notching roll, in particular has outer faces 1 oriented substantially at right angles to one another, the corners 2 formed by the outer faces and extending longitudinally of the fiber are chamfered to form edge faces 4 oriented at an angle to the outer faces 1. These edge faces 4 have projections that form anchor heads 3 for the materials to be stabilized or fastened.

As can also be seen from the drawings, the anchor heads 3 form beveled anchor faces 3.1, 3.2 that enlarge the cross-section of the fiber in the area of the edge faces 4, the cross-section of the fiber being substantially rectangular in shape in the centers of the anchor heads 3, as can be seen from FIG. 5. The center of the anchor head 3 does not have to be straight, but may certainly have a length of for instance 0.03 mm. This is attained in that for instance during the notching process the V-shaped interruption in the notch projections is worked in somewhat deeper than the notch depth. The difference in the cross-sectional area between the more or less octagonal fiber cross-section and the cross-section in the area of the anchor head 3, depending on notch depth, is about 25% and is essential for effective anchoring when there is tensile stress. The difference in cross-section between the fiber cross-section and the cross-section at the anchor head 3 is determined by the notch angle, which in practice is 90°, and by the relative notch depth. For instance, if the fiber is notched so deeply that opposing notch edges nearly touch one another, then the fiber cross-section becomes nearly square or rectangular and the difference in cross-section becomes greater (up to nearly 50%). In this case then shear fractures also occur between the notch peaks at some point in time that indicate that the material is fatigued and are therefore not necessarily desirable.

The beveled anchor faces 3.1, 3.2 may be oriented at an angle of 10° to 60° to the longitudinal axis of the fiber, a shorter interval in the range of about 15° to 30° normally being used in practice, as is shown in the drawing in FIG. 1.

As may also be seen there, in metal fibers for use in concrete the eight beveled anchor faces of an anchor head are axially symmetrical and symmetrical to the center of the anchor head, that is, at the same angle. However, if there is a desire to increase the removal forces, for instance for a fastener, without having to increase the force for driving the fastener into the material to be fastened by the same magnitude, the beveled anchor faces 3.1, 3.2 for an anchor head 3 may also be asymmetrical to the center of the anchor head 3, that is, at unequal angles, the beveled anchor faces 3.1 closer to the end of the fiber being advantageously arranged for example at a smaller angle.

As may be seen especially from FIG. 3, the edge faces 4 meet the outer face 1 at an angle of 45°; however, with the invention it is also possible for these edge faces 4 to meet the outer faces 1 at an angle of 30° to 60°, the edge face width being a function of the notch depth.

The width of the outer faces 1 in the area between the anchor heads 3 is influenced by the material properties of the metal fiber and by the manufacturing method, that is for example in the case of strip starting material it is influenced by the strip thickness, the tool design, and the notch depth, and can be about 33% of the thickness or width of the fiber. In the case of steel fiber for concrete, in the area between the anchor heads an approximately octagonal cross-section is sought and in the case of metal-fiber fasteners a square cross-section is sought.

The conventional higher quality wire steel fiber is produced from relatively high-strength unalloyed steel. Depending on the intended use, for a steel fiber for concrete for which fiber strip-like starting material is used, soft to hard starting material made of steel of different qualities may be used in order to produce it using a notching roll process with, where needed, a subsequent flexing process, as well as a separation process and cutting to length. High-strength starting material is generally used for the metal fiber fasteners. This may be high-strength stainless steel or even very strong unalloyed or alloyed steel. In principle any materials may be used if they have the appropriate properties.

In the illustrated embodiment the anchor heads 3 are formed on all four edge faces 4; however, for special applications it is also possible to provide only some of the edge faces 4 with anchor heads 3. This would apply for instance in an embodiment of a fastener, where the anchor heads 3 are provided only on the two edge faces 4 adjacent an outer face, the ends then being angled to the fastener such that the anchor heads 3 oppose one another only on the inside of the fastener. Thus the fastener has on its U-profiled outer surface no disruptive projections that might even pose a risk of injury.

The invention claimed is:

1. In a metal fiber having outer faces oriented substantially at right angles to one another, and also having bent ends in the shape of a fastener, for stabilizing, strengthening, or fastening materials and wherein corners formed by outer faces of the metal fiber and extending longitudinally of the fiber are chamfered to form edge faces oriented at an angle to the outer faces, the improvement wherein:
   the edge faces have projections that form anchor heads for the materials to be stabilized, strengthened, or fastened,
   the anchor heads form beveled anchor faces that enlarge the cross-section of the fiber in the area of the edge faces, and
   a cross-section of the fiber has a substantially square shape in centers of the anchor heads.

2. The metal fiber in accordance with claim 1, wherein the beveled anchor faces are oriented at an angle of 10° to 60° relative to a longitudinal axis of the fiber.

3. The metal fiber in accordance with claim 1, wherein the beveled anchor faces are oriented at an angle of 15° to 30° to a longitudinal axis of the fiber.

4. In a metal fiber having outer faces oriented substantially at right angles to one another, and also having bent ends in the shape of a fastener, for stabilizing, strengthening, or fastening materials and wherein corners formed by outer faces of the metal fiber and extending longitudinally of the fiber are chamfered to form edge faces oriented at an angle to the outer faces, the improvement wherein:
   the edge faces have projections that form anchor heads for the materials to be stabilized, strengthened, or fastened,
   the anchor heads form beveled anchor faces that enlarge the cross-section of the fiber in the area of the edge faces, and
   the beveled anchor faces of each anchor head are axially symmetrical and, relative to the center of the respective anchor head, symmetrical at the same angle.

5. In a metal fiber having outer faces oriented substantially at right angles to one another, and also having bent ends in the shape of a fastener, for stabilizing, strengthening, or fastening materials and wherein corners formed by outer faces of the metal fiber and extending longitudinally of the fiber are chamfered to form edge faces oriented at an angle to the outer faces, the improvement wherein:
   the edge faces have projections that form anchor heads for the materials to be stabilized, strengthened, or fastened,
   the anchor heads form beveled anchor faces that enlarge the cross-section of the fiber in the area of the edge faces,
   the beveled anchor faces of each anchor head are asymmetrical at unequal angles, and
   the beveled anchor face closer to the end of the metal fiber has a smaller angle.

6. The metal fiber in accordance with claim 1, wherein the edge faces meet the outer face at an angle of 30° to 60°.

7. The metal fiber in accordance with claim 1, wherein the edge faces meet the outer face at an angle of 45°.

8. The metal fiber in accordance with claim 1, wherein a transverse width of the outer face between the anchor heads is about 33% of a thickness or width of the fiber.

9. The metal fiber in accordance with claim 1, wherein the fiber is produced from strip material using a notching roll process and separating process, with a flexing process preceding the separating process.

10. The metal fiber in accordance with claim 1, wherein the anchor heads are provided only in pairs and not on all of the edge faces.

11. The metal fiber in accordance with claim 1, wherein the anchor heads are provided only on the two edge faces meeting the outer face, the ends being angled relative to the fastener such that the anchor heads are opposite one another on the inside of the fastener.

\* \* \* \* \*